United States Patent
Fuh et al.

(10) Patent No.: US 10,171,532 B2
(45) Date of Patent: Jan. 1, 2019

(54) METHODS AND SYSTEMS FOR DETECTION AND CLASSIFICATION OF MULTIMEDIA CONTENT IN SECURED TRANSACTIONS

(71) Applicant: Citrix Systems, Inc., Fort Lauderdale, FL (US)

(72) Inventors: Hsiehyu Fuh, Palo Alto, CA (US); Edward Wai Hong Choh, Edmonton (CA); Kannan Parthasarathy, Santa Clara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 343 days.

(21) Appl. No.: 14/503,274

(22) Filed: Sep. 30, 2014

(65) Prior Publication Data

US 2016/0094602 A1    Mar. 31, 2016

(51) Int. Cl.
*H04L 29/06* (2006.01)
*H04L 29/08* (2006.01)
*H04W 84/04* (2009.01)

(52) U.S. Cl.
CPC .......... *H04L 65/60* (2013.01); *H04L 65/1006* (2013.01); *H04L 65/605* (2013.01); *H04L 65/80* (2013.01); *H04L 67/32* (2013.01); *H04W 84/042* (2013.01)

(58) Field of Classification Search
CPC ...................................................... H04L 65/60
USPC ......................................................... 709/219
See application file for complete search history.

(56) References Cited

U.S. PATENT DOCUMENTS

| | | | | |
|---|---|---|---|---|
| 5,870,562 A | * | 2/1999 | Butnnan | G06F 17/3089 707/E17.116 |
| 6,026,430 A | * | 2/2000 | Butman | G06F 17/3089 707/E17.116 |
| 7,103,008 B2 | * | 9/2006 | Greenblat | G06F 15/78 370/229 |

(Continued)

FOREIGN PATENT DOCUMENTS

EP    2725757 A1    4/2014

OTHER PUBLICATIONS

Bestavros et al., "Performance Evaluation of Two-Shadow Speculative Concurrency Control", 1993.*

(Continued)

*Primary Examiner* — Ondrej C Vostal
(74) *Attorney, Agent, or Firm* — Fox Rothschild LLP; Robert J. Sacco; Carol E. Thorstad-Forsyth

(57) ABSTRACT

An apparatus is provided for detecting the presence of multimedia content in one or more transactions and for classifying the multimedia content in the one or more transactions. The apparatus can include a traffic processor configured to acquire one or more handshake messages associated with the transactions. The apparatus can also include a multimedia detector configured to determine a domain name requested by a specific terminal based on the one or more handshake messages, and to detect the presence of the multimedia content data in the transactions using the determined domain name. The detection of the presence of the multimedia content can be used for at least one of optimizing or reporting of the multimedia content before the multimedia content is provided to the specific terminal.

48 Claims, 7 Drawing Sheets

(56) References Cited

U.S. PATENT DOCUMENTS

| | | | | |
|---|---|---|---|---|
| 7,792,910 | B2* | 9/2010 | Yamashita | H04N 1/00209 709/202 |
| 7,933,290 | B2* | 4/2011 | Aholainen | H04L 29/06027 370/466 |
| 8,239,266 | B1* | 8/2012 | Charaniya | H04W 4/02 455/456.3 |
| 8,326,920 | B1* | 12/2012 | Modadugu | H04L 67/16 709/203 |
| 8,327,128 | B1* | 12/2012 | Prince | H04L 63/0823 713/150 |
| 8,392,980 | B1* | 3/2013 | Ahrens | H04L 63/166 380/247 |
| 8,671,069 | B2* | 3/2014 | Chang | G06F 17/30817 706/45 |
| 8,761,363 | B2* | 6/2014 | Rajagopalan | H04M 3/42263 379/142.07 |
| 8,782,722 | B1* | 7/2014 | Kellicker | H04N 7/0882 348/468 |
| 9,191,284 | B2* | 11/2015 | Kordasiewicz | H04L 65/1083 |
| 9,215,424 | B2* | 12/2015 | Bappu | H04N 7/17318 |
| 9,311,499 | B2* | 4/2016 | Redlich | G06F 21/6209 |
| 9,325,765 | B2* | 4/2016 | Su | H04L 65/80 |
| 9,426,049 | B1* | 8/2016 | Kalavade | H04L 43/0876 |
| 9,843,554 | B2* | 12/2017 | Thornewell | H04L 61/1511 |
| 2001/0032878 | A1* | 10/2001 | Tsiounis | G06Q 20/02 235/379 |
| 2002/0033844 | A1* | 3/2002 | Levy | G06F 21/10 715/744 |
| 2002/0069278 | A1* | 6/2002 | Forslow | H04L 63/0227 709/225 |
| 2003/0018753 | A1* | 1/2003 | Seki | H04L 12/2803 709/219 |
| 2003/0032391 | A1* | 2/2003 | Schweinhart | H04B 7/18582 455/12.1 |
| 2003/0081783 | A1* | 5/2003 | Adusumilli | H04L 63/04 380/270 |
| 2003/0105630 | A1 | 6/2003 | Pham et al. | |
| 2003/0174670 | A1* | 9/2003 | Mar | H04L 29/06027 370/328 |
| 2004/0078573 | A1* | 4/2004 | Matsuyama | H04L 63/061 713/175 |
| 2004/0093419 | A1* | 5/2004 | Weihl | H04L 63/06 709/229 |
| 2004/0165603 | A1* | 8/2004 | D'Angelo | H04L 51/066 370/401 |
| 2004/0210756 | A1* | 10/2004 | Mowers | H04L 63/0807 713/168 |
| 2004/0255115 | A1* | 12/2004 | DeMello | G06F 21/10 713/156 |
| 2005/0097087 | A1* | 5/2005 | Punaganti Venkata | H04L 67/16 |
| 2005/0273592 | A1 | 12/2005 | Pryor et al. | |
| 2006/0031368 | A1* | 2/2006 | deCone | G06F 9/546 709/207 |
| 2006/0106836 | A1* | 5/2006 | Masugi | G06F 21/33 |
| 2007/0073837 | A1* | 3/2007 | Johnson-McCormick | G06F 17/30038 709/217 |
| 2007/0288621 | A1* | 12/2007 | Gundu | H04W 8/005 709/223 |
| 2008/0062863 | A1* | 3/2008 | Ginde | H04L 12/66 370/221 |
| 2008/0222734 | A1* | 9/2008 | Redlich | G06F 21/577 726/26 |
| 2008/0294556 | A1* | 11/2008 | Anderson | G06Q 20/40 705/44 |
| 2009/0077383 | A1* | 3/2009 | de Monseignat | H04L 63/0823 713/175 |
| 2009/0098886 | A1* | 4/2009 | Kiss | H04W 28/06 455/456.1 |
| 2009/0104954 | A1* | 4/2009 | Weber | G07F 17/32 463/1 |
| 2009/0147772 | A1* | 6/2009 | Rao | H04L 12/1818 370/352 |
| 2009/0172129 | A1* | 7/2009 | Singh | G06F 17/3089 709/217 |
| 2009/0241159 | A1* | 9/2009 | Campagna | H04N 7/141 725/131 |
| 2009/0248494 | A1* | 10/2009 | Hueter | G06Q 10/00 705/7.29 |
| 2009/0310805 | A1* | 12/2009 | Petroff | H04R 25/453 381/318 |
| 2010/0017218 | A1* | 1/2010 | Gazetova | G06Q 30/02 705/1.1 |
| 2010/0094984 | A1* | 4/2010 | Dingier | H04L 65/1016 709/223 |
| 2010/0123727 | A1* | 5/2010 | Kwa | G09G 3/3611 345/522 |
| 2010/0259386 | A1* | 10/2010 | Holley | G06Q 30/02 340/568.1 |
| 2011/0029985 | A1* | 2/2011 | Balandin | G06F 9/526 718/107 |
| 2011/0082924 | A1 | 4/2011 | Gopalakrishnan | |
| 2011/0113106 | A1* | 5/2011 | Klein | H04L 67/24 709/206 |
| 2011/0119388 | A1* | 5/2011 | Attanasio | G06F 9/5055 709/227 |
| 2011/0243553 | A1* | 10/2011 | Russell | G06Q 30/0631 398/25 |
| 2012/0017253 | A1* | 1/2012 | Hicks, III | H04N 21/4122 725/114 |
| 2012/0084423 | A1 | 4/2012 | McGleenon | |
| 2012/0179752 | A1* | 7/2012 | Mosley | G06Q 10/10 709/204 |
| 2013/0139164 | A1* | 5/2013 | Balko | G06F 8/35 718/102 |
| 2013/0144785 | A1* | 6/2013 | Karpenko | G06Q 20/409 705/44 |
| 2013/0198511 | A1 | 8/2013 | Yoo et al. | |
| 2013/0203433 | A1* | 8/2013 | Luna | H04W 28/06 455/452.1 |
| 2013/0312054 | A1* | 11/2013 | Wang | H04L 63/0236 726/1 |
| 2014/0115100 | A1* | 4/2014 | Changuel | H04L 47/14 709/217 |
| 2014/0269269 | A1 | 9/2014 | Kowali et al. | |
| 2014/0283106 | A1* | 9/2014 | Stahura | G06Q 10/06 726/27 |
| 2015/0016253 | A1 | 1/2015 | Jaska et al. | |
| 2015/0026127 | A1* | 1/2015 | Zachrisen | G06F 17/30371 707/634 |
| 2015/0100507 | A1* | 4/2015 | Levac | G06Q 10/10 705/310 |
| 2015/0288617 | A1* | 10/2015 | Dasher | H04L 47/801 709/226 |
| 2015/0382166 | A1* | 12/2015 | Ferraz | H04L 51/10 455/414.4 |
| 2016/0028607 | A1* | 1/2016 | Weill | H04L 43/12 709/224 |
| 2016/0088322 | A1 | 3/2016 | Horev et al. | |
| 2016/0219332 | A1* | 7/2016 | Asbun | H04N 21/42201 |
| 2016/0241626 | A1 | 8/2016 | Parthasarathy | |
| 2016/0248684 | A1 | 8/2016 | Parthasarathy | |

OTHER PUBLICATIONS

Blake-Wilson et al., "Transport Layer Security (TLS) Extensions", RFC 3546, 2003.*

Dierks et al., "The TLS Protocol Version 1.0", RFC 2246, 1999.*

Dierks et al., "The Transport Layer Security (TLS) Protocol Version 1.2", RFC 5246, 2008.*

McKinley, "SSL and TLS: A Beginners Guide", 2003.*

Wikipedia, "Transport Layer Security", 2017.*

Crocker, "Standard for the format of ARPA Internet Text Messages", RFC 0822, 1982 (Year: 1982).*

Davidowicz, "Domain Name System (DNS) Security", 1999 (Year: 1999).*

(56) References Cited

OTHER PUBLICATIONS

De Capitani et al., "Data and Applications Security XVII Status and Prospects", 2003 (Year: 2003).*
Eastlake, "Domain Name System Security Extensions", RFC2535, 1999 (Year: 1999).*
Mockapetris, "Domain Names—Concepts and Facilities", RFC 1034, 1987 (Year: 1987).*
Paleologu et al., "International Journal on Advances in Systems and Measurements", 2011 (Year: 2011).*
Pinkas et al., "Delegated Path Validation and Delegated Path Discovery Protocol Requirements", RFC 3379, 2002 (Year: 2002).*
Santesson, "Internet X.509 Public Key Infrastructure Subject Alternative Name for Expression of Service Name", RFC4985, 2007 (Year: 2007).*
Wikipedia, "Domain Name System Security Extensions", 2018 (Year: 2018).*
International Search Report and Written Opinion issued in PCT/US2015/053047 dated Feb. 25, 2016; 17 pages.

* cited by examiner

METHODS AND SYSTEMS FOR DETECTION AND CLASSIFICATION OF MULTIMEDIA CONTENT IN SECURED TRANSACTIONS

BACKGROUND

The recent few years has witnessed an explosive growth of data traffic in networks, particularly in cellular wireless networks. This growth has been fueled by a number of new developments that includes faster, smarter and more intuitive mobile devices such as the popular iPhone® series and the iPad® series, as well as faster wireless and cellular network technologies that deliver throughputs on par or better than fixed line broadband technologies.

For many people today, a primary mode of access to the Internet is via mobile devices using cellular wireless networks. Users have come to expect the same quality of experience as in fixed line broadband networks. To meet this insatiable demand, wireless network operators are taking a number of steps such as installing additional cell towers in congested areas, upgrading the backhaul network infrastructure that connects the base stations with the packet core, and deploying newer radio access technologies such as Dual-Cell High Speed Downlink Packet Access (DC-HSDPA) and Long Term Evolution (LTE). While these approaches help with meeting the demand for quality of experience, the slow pace at which major network upgrades can be made is not keeping up with the rate at with data traffic is growing. Furthermore, the cost of such network upgrades is not commensurate with the revenue per subscriber that the wireless operator is able to get, i.e., the cost being much higher than any increase in revenue the wireless operator can expect. Faced with these challenges, cellular wireless network operators across the globe are introducing various traffic management techniques to control the growth of data traffic and increase their revenues at the same time.

Traffic Management is a broad concept and includes techniques such as throttling of low priority traffic, blocking or time shifting certain types of traffic, and traffic optimization. Optimization of web and video traffic is a key component in the array of traffic management techniques used by wireless operators. Web traffic refers to traditional web site browsing, and video traffic refers to watching videos over the Internet—between the two, web and video traffic account for more than 80% of the data traffic in typical cellular wireless networks.

DETAILED DESCRIPTION

Reference will now be made in detail to the exemplary embodiments consistent with the embodiments disclosed herein, the examples of which are illustrated in the accompanying drawings. Wherever possible, the same reference numbers will be used throughout the drawings to refer to the same or like parts.

Network congestion or overload conditions in networks are often localized both in time and space and affect only a small set of users at any given time. This can be caused by the topology of communication systems. In an exemplary cellular communication system, such as the system shown in FIG. 1, the system can have a tree-like topology, with a router or a gateway being the root of the tree and the mobile base stations being the leaves. This tree-like topology is similar across cellular technologies including Global System for Mobile Communication (GSM), Universal Mobile Telecommunications System (UMTS) adopting Wideband Code Division Multiple Access (W-CDMA) radio access technology, CDMA2000, Worldwide Interoperability for Microwave Access (WiMax) and Long Term Evolution (LTE). In a tree-like structure of a wireless network, the impact of network overload conditions depends on the level of aggregation in the network where that overload condition occurs. For example, an overload condition at a base station level affects only those users who are connected to that base station. Therefore, in some embodiments, the adaptive traffic management identifies the aggregation level at which an overload condition occurs and then applies traffic management techniques in a holistic fashion across only those users that are affected by the overload condition.

Adaptive traffic management is an approach wherein traffic management techniques such as web and video optimization can be applied selectively based on monitoring key indicators that have an impact on the Quality of Experience (QoE) of users or subscribers. Applying optimization can involve detecting the presence of multimedia content in secured or unsecured transactions and classifying multimedia content in the transactions. A subscriber can be a mobile terminal user who subscribes to a wireless or cellular network service. While the subscriber refers to the mobile terminal user here, future references to subscriber can also refer to a terminal that is used by the subscriber, or refer to a client device used by the subscriber.

Figure 1:
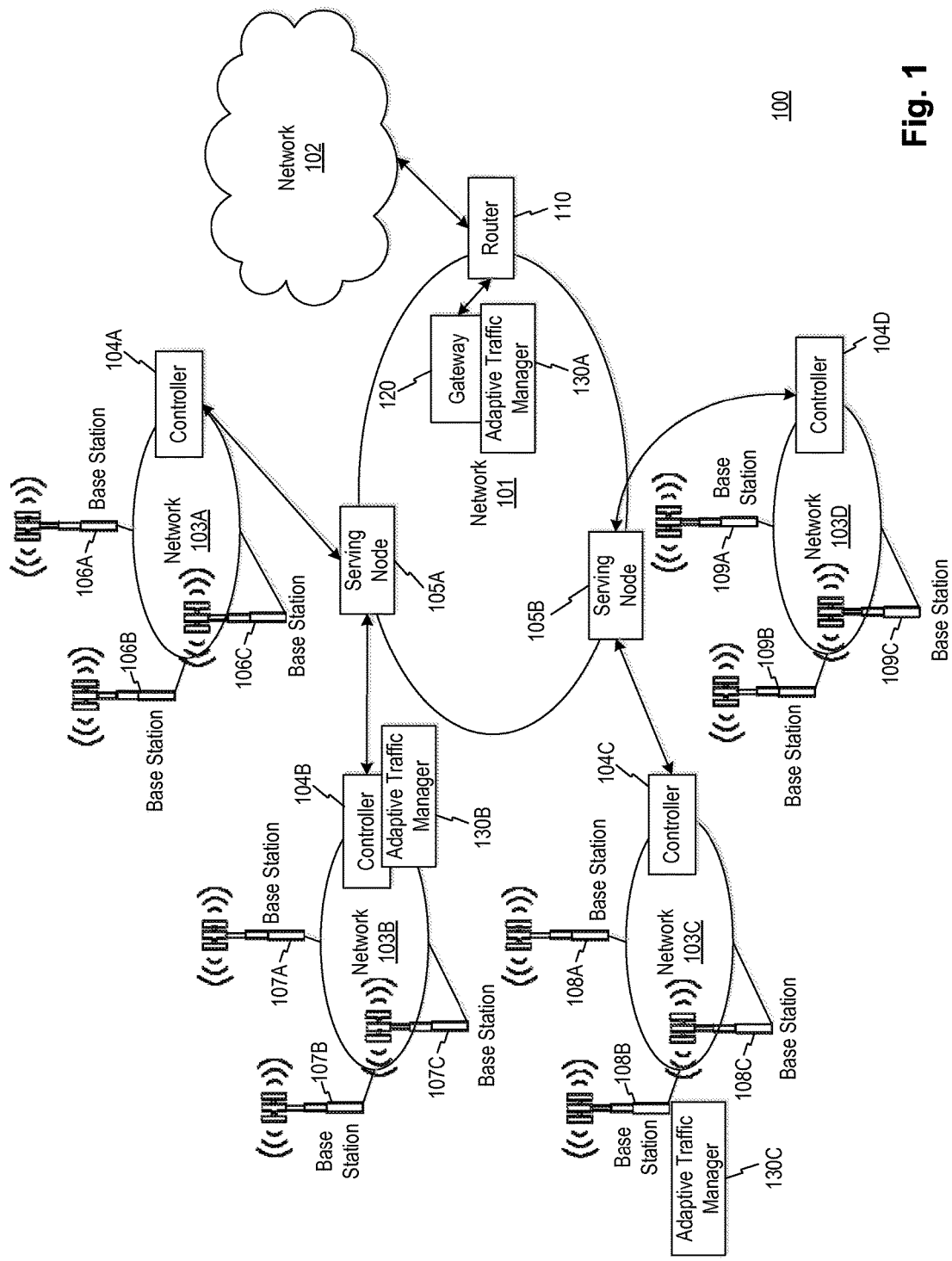
FIG. 1 is a block diagram of an exemplary network system, consistent with embodiments of the present disclosure.

FIG. 1 is a block diagram of an exemplary network system. Exemplary communication system 100 can be any type of system that transmits data packets over a network. For example, the exemplary communication system 100 can include one or more networks transmitting data packets across wired or wireless networks to terminals (terminals not shown in FIG. 1). The exemplary communication system 100 can have network architectures of, for example, a GSM network, a UMTS network that adopts Wideband Code Division Multiple Access (W-CDMA) radio access technology, a CDMA2000 network, and a WiMax network.

The exemplary communication system 100 can include, among other things, one or more networks 101, 102, 103 (A-D), one or more controllers 104(A-D), one or more serving nodes 105(A-B), one or more base stations 106(A-D)-109(A-D), a router 110, a gateway 120, and one or more adaptive traffic managers 130(A-C). At a high level, the network topology of the exemplary communication system 100 can have a tree-like topology with gateway 120 being the tree's root node and base stations 106-109 being the leaves.

Router 110 is a device that is capable of forwarding data packets between networks, creating an overlay internetwork. Router 110 can be connected to two or more data lines from different networks. When a data packet comes in on one of the lines, router 110 can determine the ultimate destination of the data packet and direct the packet to the next network on its journey. In other words, router 110 can perform "traffic directing" functions. In the exemplary embodiment shown in FIG. 1, router 110 communicates with network 102 and gateway 120. Router 110 directs traffic from the network 102 to the gateway 120 and vice versa.

Network 101 can be any combination of radio network, wide area networks (WANs), local area networks (LANs), or wireless networks suitable for packet-type communications, such as Internet communications. For example, in one exemplary embodiment, network 101 can be a General Packet Radio Service (GPRS) core network, which provides mobility management, session management and transport for Internet Protocol packet services in GSM and W-CDMA networks. The exemplary network 101 can include, among other things, a gateway 120, and one or more serving nodes 105(A-B).

Gateway 120 is a device that converts formatted data provided in one type of network to a particular format required for another type of network. Gateway 120, for example, may be a server, a router, a firewall server, a host, or a proxy server. Gateway 120 has the ability to transform the signals received from router 110 into a signal that network 101 can understand and vice versa. Gateway 120 may be capable of processing webpage, image, audio, video, and T.120 transmissions alone or in any combination, and is capable of full duplex media translations. As an exemplary embodiment, gateway 120 can be a Gateway GPRS Support Node (GGSN) that supports interworking between the GPRS network and external packet switched networks, like the Internet and X.25 networks.

Serving nodes 105 are devices that deliver data packets from gateway 120 to a corresponding network 103 within its geographical service area and vice versa. A serving node 105 can be a server, a router, a firewall server, a host, or a proxy server. A serving node 105 can also have functions including packet routing and transfer, mobility management (attach/detach and location management), logical link management, network accessing mediation and authentication, and charging functions. As an exemplary embodiment, a serving node 105 can be a Serving GPRS Support Node (SGSN). SGSN can have location register, which stores location information, e.g., current cell, current visitor location (VLR) and user profiles, e.g., International Mobile Subscriber Identity (IMSI), and addresses used in the packet data network, of all GPRS users registered with this SGSN.

Network 102 can include any combination of wide area networks (WANs), local area networks (LANs), or wireless networks suitable for packet-type communications. In some exemplary embodiments, network 102 can be, for example, Internet and X.25 networks. Network 102 can communicate data packet with network 101 with or without router 110.

Networks 103 can include any radio transceiver networks within a GSM or UMTS network or any other wireless networks suitable for packet-type communications. In some exemplary embodiments, depending on the underlying transport technology being utilized, the Radio Access Network (RAN) or Backhaul area of network 103 can have a ring topology. In some embodiments, network 103 can be a RAN in a GSM system or a Backhaul area of a UMTS system. The exemplary network 103 can include, among other things, base stations 106-109 (e.g., base transceiver stations (BTSs) or Node-Bs), and one or more controllers 104(A-C) (e.g., base-station controllers (BSCs) or radio network controllers (RNCs)). Mobile terminals (not shown in FIG. 1) communicate with BTS/Node-B 106-109 which have radio transceiver equipment. BTS/Node-B 106-109 communicate with BSC/RNC 104(A-C), which are responsible for allocation of radio channels and handoffs as users move from one cell to another. The BSC/RNC 104(A-C) in turn communicate to serving nodes 105, which manage mobility of users as well as provide other functions such as mediating access to the network and charging.

As shown in FIG. 1, adaptive traffic manager 130 can be deployed at one or more locations within communication system 100, including various locations within network 101 and 103. In some embodiments, adaptive traffic manager 130 can be located at gateway 120, at controller 104, at one or more base stations 106-109, or any other locations. Adaptive traffic manager 130 can be either a standalone network element or can be integrated into existing network elements such as gateway 120, controllers 104, and base stations 106-109. Adaptive traffic manager 130 can continuously monitor several parameters of communication system 100. The parameters can be used to generate traffic management rules. The traffic management rules are generated dynamically and change in real-time based on the monitored parameters. After the rules are generated in real time, the rules are applied to data traffic being handled by adaptive traffic manager 130. Moreover, adaptive traffic manager 130 can include a multimedia detector and classifier 220 (shown in FIG. 2) for detecting the presence of multimedia contents in secured or unsecured transactions and for classifying the multimedia content in secured or unsecured transactions. Multimedia detector and classifier 220 is described in more detail below.

To optimize web and video traffic, traffic management techniques can be implemented on a proxy device (e.g., adaptive traffic manager 130) that is located somewhere between a content server and client devices (e.g., mobile terminals). The proxy device can determine the type of content requested by a mobile terminal (e.g., video content) and apply optimization techniques. The content providers can transmit content using unsecured or secured communication protocols such as Hypertext Transfer Protocol Secure (HTTPS), Transport Layer Security (TLS), and Secure Sockets Layer (SSL) protocols. The proxy device can determine the type of content being transmitted in both unsecured and secured transactions using client requests and server responses. In secured transactions, the client requests and server responses are encrypted and therefore may not be accessible by the proxy device.

Moreover, a variety of multimedia protocols above the HTTP layer are available for transmitting of multimedia contents. The protocols can generally be classified into two broad categories: progressive download (PD) protocols and adaptive bit rate (ABR) protocols. Examples of ABR protocols include HTTP live streaming (HLS), dynamic adaptive streaming over HTTP (DASH), and smooth streaming. Examples of PD protocols include flash video (FLV) file and Mpeg-4 (MP4) file downloads over HTTP.

For both PD and ABR protocols, multiple quality levels (e.g., video resolutions 1080p, 720p, etc.) of the same multimedia content can be stored at the server for transmitting to client devices. In the case of transmitting of multimedia contents using PD protocols, the multimedia quality level requested by the client device cannot be changed after the initial selection at the beginning of transmission. In the case of transmitting of multimedia contents using ABR protocols, the multimedia quality level requested by the client device can be changed to reflect fluctuations in the available network bandwidth between the server and the client device. Therefore, ABR protocols typically provide a better user experience because the highest available quality level can be selected based on the available network bandwidth.

To apply traffic management techniques, such as to apply streaming policy control (SPC) to the transmission of multimedia contents, it is usually required to determine whether PD protocols or ABR protocols are used for the transmission. Moreover, multimedia session reporting can also require distinguishing between PD protocols or ABR protocols. Streaming policy control can be any traffic management technique that manages data flow or controls congestion associated with streaming of multimedia data across a network, such as the Internet. For example, SPC can allow streaming of the multimedia data to more effectively share bandwidths with other network traffics. SPC can also improves smoothness in streaming and provide decreased and more predictable latency.

Figure 2:
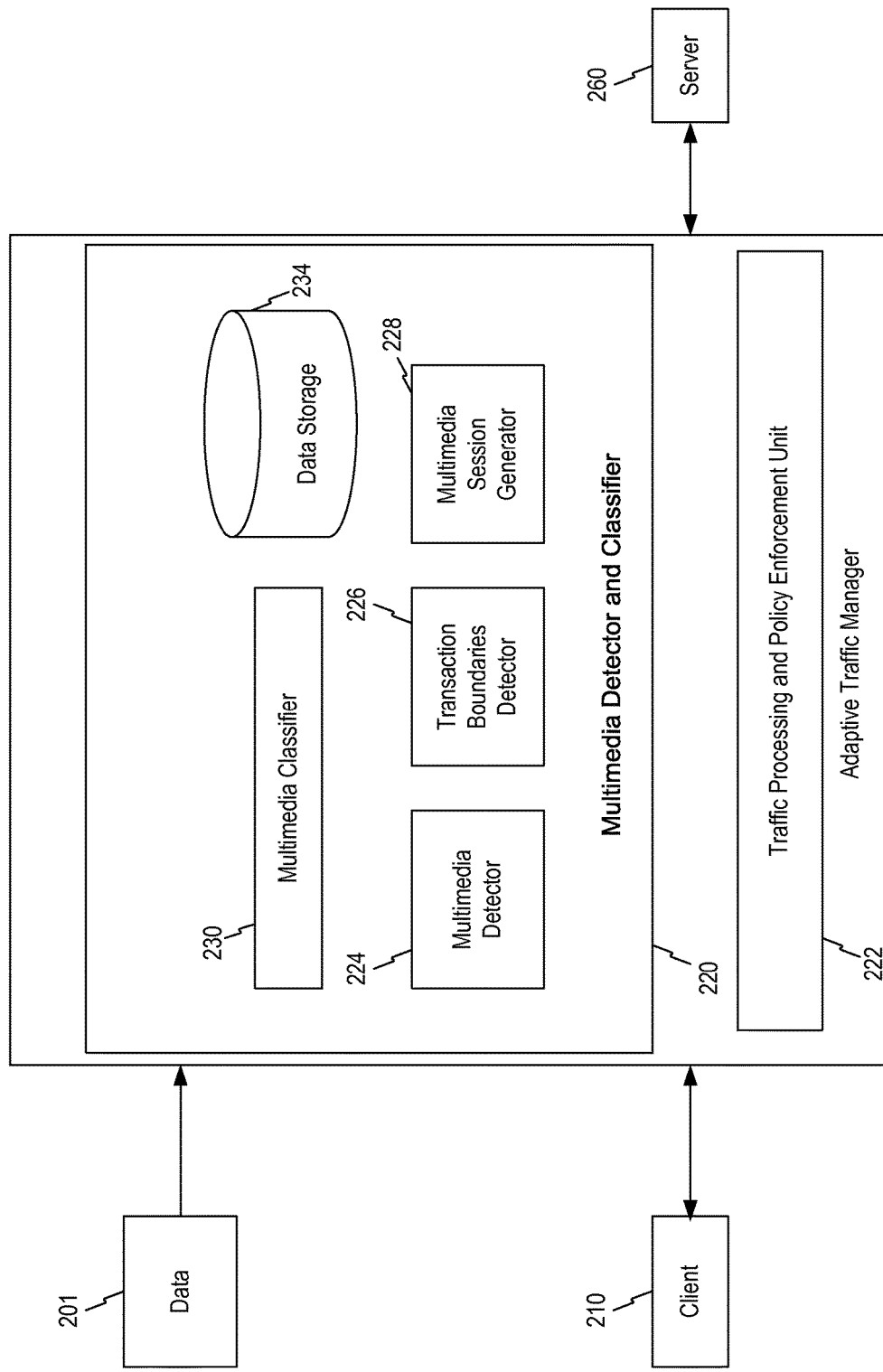
FIG. 2 is a block diagram illustrating an embodiment of an exemplary multimedia detector and classifier, consistent with embodiments of the present disclosure.

FIG. 2 is a block diagram illustrating an embodiment of an exemplary multimedia detector and classifier 220. In some embodiments, as shown in FIG. 2, multimedia detector and classifier 220 can be integrated with adaptive traffic manager 130. In some embodiments, multimedia detector and classifier 220 can be integrated into other existing network elements such as gateway 120, controllers 104, and/or one or more base stations 106-109. Multimedia detector and classifier 220 can also be a standalone network element located at gateway 120, controller 104, one or more base stations 106-109, or any other proper locations.

As shown in FIG. 2, adaptive traffic manager 130 can include, among other things, a traffic processing and policy enforcement unit 222 and multimedia detector and classifier 220. Adaptive traffic manager 130 can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs or one or more computer.

Adaptive traffic manager 130 can obtain external data 201 for processing. External data 201 can include network probes, Remote Authentication Dial-In User Service (RADIUS), Policy Charging and Rules Function (PCRF), and Subscriber Profile Repository (SPR). Adaptive traffic manager 130 can also communicate with one or more terminals (e.g., client 210) and server 260, either directly or indirectly.

Traffic processing and policy enforcement (TPPE) unit 222 is a lower stack in the processing stack of adaptive traffic manager 130. TPPE unit 222 can receive multimedia content, which can include video and/or web data, and provide the multimedia content to other elements and/or modules in adaptive traffic manager 130. The multimedia content can be stored in a data storage device (e.g., data storage 234) that is local to or remote from adaptive traffic manager 130. TPPE unit 222 is responsible for routing traffic between client 210 and the server 260. TPPE unit 222 can also implement traffic management techniques including blocking, rate limiting, lossless and lossy data compression, and other traffic optimization techniques. TPPE unit 222 can be a software program and/or a hardware device.

Multimedia detector and classifier 220 can include, among other things, a multimedia detector 224, a transaction boundaries detector 226, a multimedia session generator 228, a multimedia classifier 230, and a data storage 234.

Multimedia detector 224 can detect the presence of multimedia content in secured transactions, such as SSL/TLS transactions. In some embodiments, multimedia detector 224 can acquire one or more handshake messages associated with the secured transactions for transmitting multimedia content between client 210 and server 260. A secured connection can include a plurality of secured transactions for transmitting multimedia content. For example, multimedia content (e.g., a video clip or session) can be transmitted over several HTTP transactions and can use one or more transmission control protocols (TCP) connections. After establishing the TCP connection, if the multimedia content are required to be encrypted, one or more secure tunnels between client 210 and server 260 can be established using SSL or TLS protocols. After the establishing of the secure tunnels, all transactions between client 210 and server 260 are encrypted and thus secured.

Figure 3:
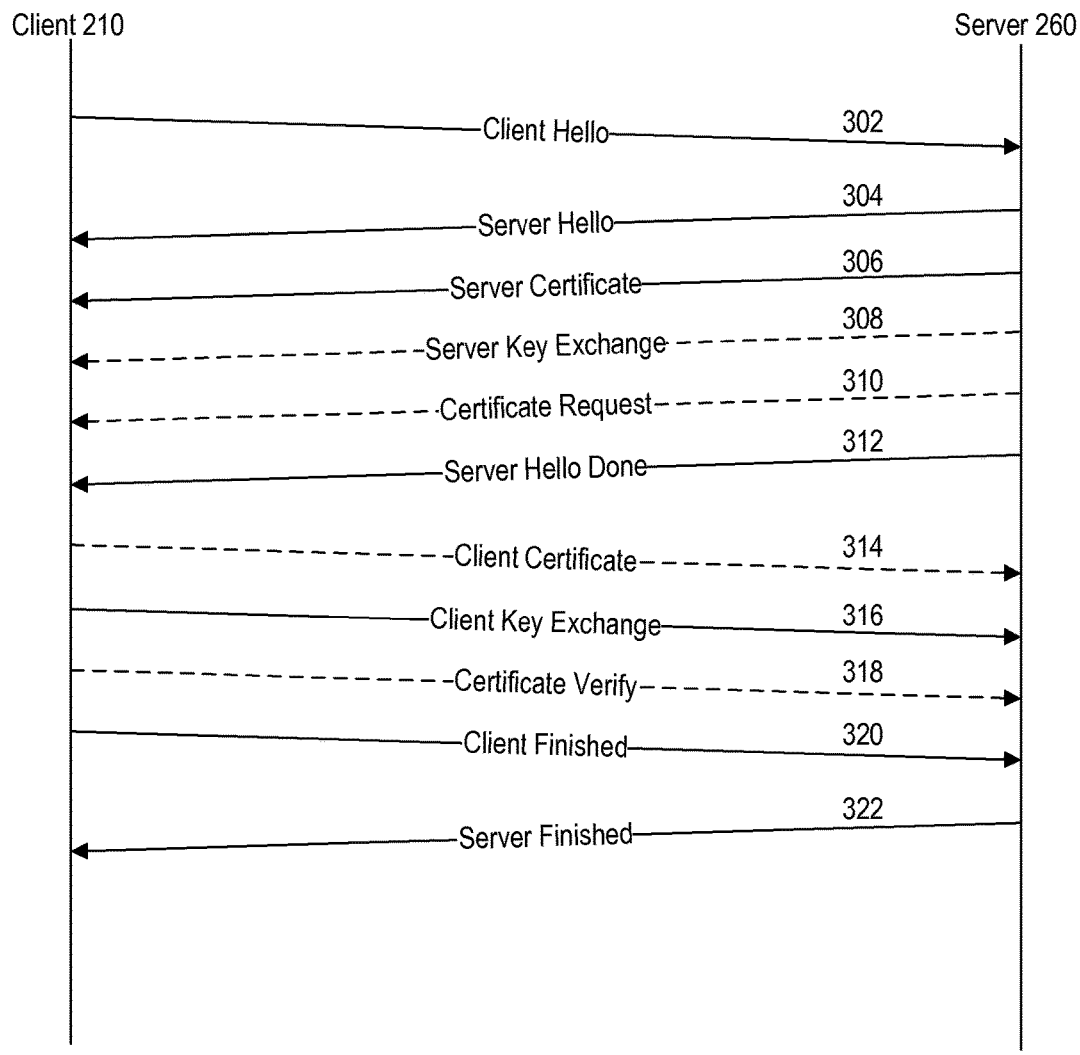
FIG. 3 is a diagram of an exemplary message flow between a client and a server, consistent with embodiments of the present disclosure.

To establish a secure tunnel, one or more messages (e.g., handshake messages 302-322 as shown in FIG. 3) are transmitted between client 210 and server 260. FIG. 3 is a diagram of an exemplary message flow between a client device (e.g., client 210) and a server (e.g., server 260). For example, to establish a new secured connection, client 210 can send a client hello message 302 when client 210 first connects to server 260. Client 210 can also send client hello message 302 in response to a hello request (not shown) or on its own initiative to renegotiate the security parameters in an existing connection. Client hello message 302 can include information such as the highest SSL or TLS protocol versions client 210 supports, application-layer protocol negotiation (ALPN) indicating a list of supported application protocols, next protocol negotiation extension (NPN) protocols, a random number, a list of suggested cipher suites for negotiating the security settings, a session identification (ID), and a server name indication (SNI).

As shown in FIG. 3, after server 260 receives client hello message 302, it can respond with a server hello message 304. Server hello message 304 can include the SSL or TLS protocol version that server 260 selects, a random number that is independently generated from the random number in client hello message 302, a session ID corresponding to the session in the current connection, a cipher suite selected by server 260, and selected ALPN and NPN protocols.

Server 260 can also send a server certificate message 306 to client 210. In some embodiments, server 260 sends certificate message 306 if the agreed-upon key exchange method uses certificates for authentication. Server certificate message 306 can include one or more certificates, which can have certificate's public key. The certificate's public key can include a subject field identifying the entity (e.g., Google) associated with the public key stored in the subject public key field. A subject name associated with the entity can be identified in the subject field and/or the subject-alt-name (SAN) field. Server certificate message 306 can also include a common name field. A common name can be composed of host and domain names (e.g., www.youtube.com). In some embodiments, the common name can be the same as or similar to the web address that client 210 requests to access when establishing a secured connection.

As shown in FIG. 3, server 260 can also send a server key exchange message 308. In some embodiments, server 260 sends server key exchange message 308 if server certificate message 306 does not contain enough data to allow client 210 to exchange a premaster secret. Server key exchange message 308 can provide cryptographic information to allow client 210 to communicate the premaster secret (e.g., a Diffie-Hellman public key with which client 210 can complete a key exchange).

As shown in FIG. 3, server 260 can also send a certificate request message 310 to request a certificate from client 210. In some embodiments, server key exchange message 308 and certificate request message 310 are optional. After server 260 sends certificate request message 310, it can send server hello done message 312 to client 210, indicating the end of server hello message 304 and associated messages 306-310. After sending server hello done message 312, server 260 waits for a response from client 210.

After client 210 receives server hello done message 312 from server 260, client 210 can respond with client certificate message 314, client key exchange message 316, and certificate verify message 318. Client 210 sends client certificate message 314 if server 260 requested a certificate, and provides the client certificate to server 260. Client key exchange message 316 follows client certificate message 314. In some embodiments, with client key exchange message 316, the premaster secret can be established by direct transmission of the RSA-encrypted secret or by the transmission of Diffie-Hellman parameters that will allow each side to agree upon the same premaster secret.

As shown in FIG. 3, client 210 can also send certificate verify message 318 to provide explicit verification of a client certificate. In some embodiments, certificate verify message 318 can be sent following a client certificate that has signing capability (e.g., all certificates except those containing fixed Diffie-Hellman parameters). After client 210 sends message 314-318, it sends client finished message 320, indicating the end of client handshake messages. After receiving client finished message 320, server 260 sends a server finished message, indicating the end of server handshake messages.

Referring back to FIG. 2, multimedia detector 224 can acquire handshake messages 302, 304, and 306 or copies of handshake messages 302, 304, and 306 (together referred to as handshake messages 302, 304, and 306), and can determine a domain name requested by client 210 based on the acquired handshake messages. In some embodiments, multimedia detector 224 can parse client hello message 302. As stated above, client hello message 302 can include information such as the highest SSL or TLS protocol version client 210 supports, application-layer protocol negotiation (ALPN) indicating a list of supported application protocols, next protocol negotiation extension (NPN) protocols, a random number, a list of suggested cipher suites, a session identification (ID), and a server name indication (SNI). After parsing client hello message 302, multimedia detector 224 can determine whether the SNI field is available based on the parsed fields in client hello message 302.

In some embodiments, the SNI field provides an identification of the destination host requested by client 210. Therefore, determining the availability of the SNI field can enable multimedia detector 224 to detect the presence of multimedia content in the secured transactions. Under the SSL or TLS protocol, including the SNI field in client hello message 302 can be optional. Therefore, if multimedia detector 224 determines that an SNI field is available, it can acquire a domain name (e.g., youtube.com) using the SNI field. Multimedia detector 224 can detect the presence of the multimedia content in the secured transactions based at least in part on the determined domain name. For example, if the domain name in the SNI field indicates the identification of the destination host is youtube.com, it is likely that the multimedia content (e.g., a YouTube video) is present in the secured transactions.

In some embodiments, the SNI field can be used for detecting the presence of the multimedia content when multiple destination hosts share a common Internet Protocol (IP) address. For example, multiple virtual hosts or services can be executed on a shared physical computing infrastructure (e.g., a shared physical server).

In some embodiments, if multimedia detector 224 determines that an SNI field is not available in client hello message 302, or if the SNI field does not provide an identification of the destination host requested by client 210, multimedia detector 224 can parse server certificate message 306 to determine whether a subject-alt-name (SAN) field is available in server certificate message 306. As stated above, the SAN field enables identifying of the entity (e.g., Google Inc.) associated with the public key.

In some embodiments, if multimedia detector 224 determines that an SAN field is available, multimedia detector 224 can further determine whether the number of entries associated with the SAN field equals one. For example, multimedia detector 224 can determine that the SAN field has more than one entry, indicating multiple entities may be associated with the public key (e.g., subsidiaries or partners of Google Inc.). In some embodiments, if the number of entries associated with the SAN field is greater than one, multimedia detector 224 may not be able to determine the identity of the entity, and the associated domain name based on the SAN field entries. Multimedia detector 224 can thus provide, for example, a "null" signal, indicating the failure of detecting the presence of multimedia content in the secured transactions. If the number of entries associated with the SAN field equals one, multimedia detector 224 can acquire the domain name associated with the identity of the entity based on the SAN field, and therefore can detect the presence of the multimedia content in the secured transactions based at least in part on the determined domain name. In some embodiments, multimedia detector 224 may still detect the presence of the multimedia content even if the number of entries associated with the SAN field is greater than one. For example, if multimedia detector 224 determines that a substantial number of multiple entries in the SAN field identify entities supplying multimedia content, multimedia detector 224 can determine the domain names. Based on the determination of domain names, multimedia detector 224 can detect the presence of multimedia content. It is appreciated that multimedia detector 224 can detect the presence of multimedia content based on the entries in the SAN field in any desired manner.

In some embodiments, if multimedia detector 224 determines that an SAN field is not available in server certificate message 306, or if the number of entries associated with the SAN field is greater than one, multimedia detector 224 can determine whether a common name field is available in server certificate message 306. As stated above, a common name can be composed of host and domain name (e.g., www.youtube.com). In some embodiments, the common name can be the same as the web address that client 210 requests to access when establishing a secured connection. If multimedia detector 224 determines that a common name field is available, it can acquire the domain name based on the determined common name field. If multimedia detector 224 determines that a common name field is unavailable, multimedia detector 224 may not be able to determine a domain name based on the common name field, and thus can provide, for example, a "null" signal, indicating the failure of detecting presence of multimedia content in one or more secured transactions.

The detection of the presence of the multimedia content can be used for providing one or more traffic management optimization for the multimedia content data to client 210. For example, if multimedia detector 224 detects that multimedia content is present in the secured transaction, additional network bandwidth can be allocated to client 210. In some embodiments, traffic management optimization can be applied to multiple client devices (e.g., multiple terminals within a same local area network), a subscriber, multiple subscribers, a specific client device, or a particular mobile application or applications installed on the specific client device (e.g., a YouTube application installed on a mobile terminal). In some embodiments, the detection of the multimedia content can also be used for reporting the multimedia content. For example, the detection of the multimedia content can be used to report the presence of the multimedia content in a deep packet inspection (DPI) application.

Referring to FIG. 2, in some embodiments, multimedia detector and classifier 220 can also classify the multimedia content in the secured or unsecured transactions. The protocols can be, for example, the progressive download (PD) protocols and the adaptive bit rate (ABR) protocols. ABR protocols differ from the PD protocols in several aspects, including, for example, the behavior at the beginning of the transmission of the multimedia content. In some embodiments, under the ABR protocols, during the beginning of the transmission (e.g., a few seconds), client 210 can estimate the channel bandwidth and dynamically change the quality level of the multimedia content. As an example, if the current quality level is low (e.g., 240p) and client 210 determines that the available bandwidth is enough to increase the quality level by one or more resolution steps, client 210 can request to increase quality level (e.g., to 720p) in subsequent messages it sends to server 260. As another example, if client 210 determines that the current available bandwidth is not enough to support the current quality level (e.g., 1080p) associated with the multimedia content, client 210 can request to decrease the quality level (e.g., to 720p) in subsequent messages it sent to server 260.

In some embodiments, under the ABR protocols, at least partially because of the client requests of changing (increasing or decreasing) the multimedia quality levels, the number of transactions (which can include client-requests and server responses) during the beginning period of transmitting the multimedia content can be greater than the number of transactions under the PD protocols. As stated above, under the PD protocols, client 210 does not request to change the quality level and therefore the multimedia content is transmitted from server 260 using a single quality level. As such, the number of transactions in the transmission under the PD protocols can be smaller (e.g., one transaction) than the number of transactions in the transmission under the ABR protocols.

As shown in FIG. 2, TPPE unit 222 can acquire one or more transactions between client 210 and server 260. The one or more transactions can include one or more requests from client 210 and one or more corresponding responses from server 260. Multimedia detector and classifier 220 can include transaction boundaries detector 226. In some embodiments, if multimedia detector 224 detects the presence of multimedia content in one or more secured transactions, transaction boundaries detector 226 can detect transaction boundaries associated with the transactions. In some embodiments, if detecting the presence of multimedia content is unavailable (e.g., a failure of detection or an unreliable detection), transaction boundaries detector 226 can be configured to initially treat the transactions as containing multimedia content and proceed to detect transaction boundaries.

Figure 4A:
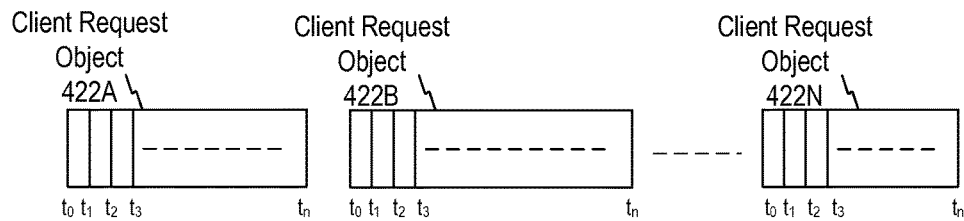
FIG. 4A is a block diagram illustrating exemplary client requests, consistent with embodiments of the present disclosure.

Transactions can include a plurality of client requests and corresponding server responses. As an example, a single TCP connection can carry one or more transactions such as HTTP transactions. Transaction boundaries detector 226 can detect the boundaries between adjacent client requests and adjacent server responses. FIG. 4A is a block diagram 420 illustrating an exemplary plurality of client request objects 422A, 422B, 422C (collectively called client request objects 422) representing client requests. To generate client request objects 422, transaction boundaries detector 226 can acquire request data included in the one or more client requests and obtain one or more request times (e.g., $t_0$, $t_1$, $t_2$, $t_3$, ... $t_n$) associated with acquiring the request data associated with the one or more client requests. Client request objects are also referred to as request objects. Server response objects are also referred to as response objects.

For example, transaction boundaries detector 226 can generate request objects representing the client requests and response objects representing the server response. The request object and the response object can be any record, pointer, or data structure stored on a hardware and/or software-based data storage device, for example, data storage 234. For example, the contents of the request and response objects can be stored as records or indexes in a single data structure or the contents of each request and response objects can be recorded in a separate transaction list data structure.

As shown in FIG. 4A, with respect to client request object 422A, transaction boundaries detector 226 can record the initial request time when the client request object is generated (e.g., $t_0$ or when the client request represented by client request object 422A initiates). In some embodiments, after client 210 sends first request data associated with the client request to server 260, transaction boundaries detector 226 can acquire the first request data (e.g., via a client socket of adaptive traffic manager 130) and record the number of bytes of the first request data and a timestamp (e.g., at time $t_1$) indicating when the first request data is sent or acquired. If client 210 sends subsequent request data associated with the same client request represented by client request object 422A, transaction boundaries detector 226 can acquire these subsequent request data (e.g., via a client socket of adaptive traffic manager 130) and record the number of bytes in the subsequent request data and timestamps (e.g., at time $t_2$, $t_3$, ... $t_n$) indicating when the subsequent request data is sent or acquired.

Similarly, transaction boundaries detector 226 can record the initial response time when the response object (not shown) is generated. In some embodiments, after server 260 sends first response data associated with a first server-response (not shown) to client 210, transaction boundaries detector 226 can acquire the first response data (e.g., via a server socket of adaptive traffic manager 130) and record the number of bytes of the first response data and a timestamp indicating when the first response data is sent or acquired. If server 260 sends subsequent response data associated with the same server response, transaction boundaries detector 226 can acquire the subsequent response data (e.g., via server socket of adaptive traffic manager 130). Transaction boundaries detector 226 can record the number of bytes in the subsequent response data and timestamps indicating when the subsequent response data are sent or acquired.

After obtaining times associated with acquiring the request data associated with the one or more client requests, transaction boundaries detector 226 can determine the transaction boundaries based on the times associated with the acquiring of the request data and a transaction threshold idle time. In some embodiments, transaction boundaries detector 226 can make this determination based on a timer having a preconfigured transaction threshold idle time (e.g., 2 seconds). The timer can be restarted after adaptive traffic manager 130 receives, via a client socket, request data associated with the same client request. If the transaction boundaries detector 226 determines that client 210 has not sent any subsequent request data associated with the same client request for a time that is equal to or greater than the transaction threshold idle time, or that that client 210 has been idle for at least the transaction threshold idle time, transaction boundaries detector 226 can mark the corresponding client request object (e.g., client request object 422A) as closed. If a request object is marked as closed, transaction boundaries detector 226 records the stop time (e.g., $t_n$) in the client request object and determines that the request portion of the current transaction has ended. For example, if transaction boundaries detector 226 determines that client 210 has been idle for at least the transaction threshold idle time (e.g., 2 seconds) after client 210 sends data at time $t_n$, it can mark client request object 422A as closed. If transaction boundaries detector 226 acquires any subsequent data from client 210, it can associate the data with a new client request object 422B.

In some embodiments, a transaction ends after the corresponding TCP connection is closed. In some implementation of TLS protocols, TCP connection can be closed after additional messages are exchanged between client 210 and server 260 in a teardown sequence. In some embodiments, a transaction ends after a subsequent client request is acquired by transaction boundaries detector 226, indicating the beginning of a subsequent transaction.

As shown in FIG. 2, multimedia detector and classifier 220 can include multimedia session generator 228. Multimedia session generator 228 can generate a multimedia session based on the detected transaction boundaries. A multimedia session can represent, for example, one or more single video clip, one or more episodes, one or more full-length movie, or any videos provided at a multimedia website (e.g., YouTube). For example, client 210 can request multiple multimedia contents (e.g., two movies). If client 210 plays the multiple multimedia contents continuously in a period of time, the multiple multimedia contents can be represented in a single multimedia session. In some embodiments, the multiple multimedia contents represented by a multimedia session can have idle time intervals between the consecutive multimedia contents (e.g., the time for switching from a first movie to an immediately subsequent movie).

In some embodiments, within a single multimedia session, the idle time intervals can be less than a predefined session threshold idle time. For example, if the idle time interval between two consecutive videos is less than a session threshold idle time (e.g., thirty seconds), multimedia session generator 228 can determine that the two videos can be represented in one multimedia session.

In some embodiments, after client 210 and server 260 establishes a secured or unsecured connection for transmitting multimedia content, multimedia session generator 228 can generate a multimedia session object, which can represent a multimedia session. A multimedia session object can be any record, pointer, or data structure stored on a hardware and/or software-based data storage device, for example, data storage 234. For example, the contents of the multimedia session object can be stored as records or indexes in a single data structure or the contents of each multimedia session object can be recorded in a separate transaction list data structure.

Figure 4B:
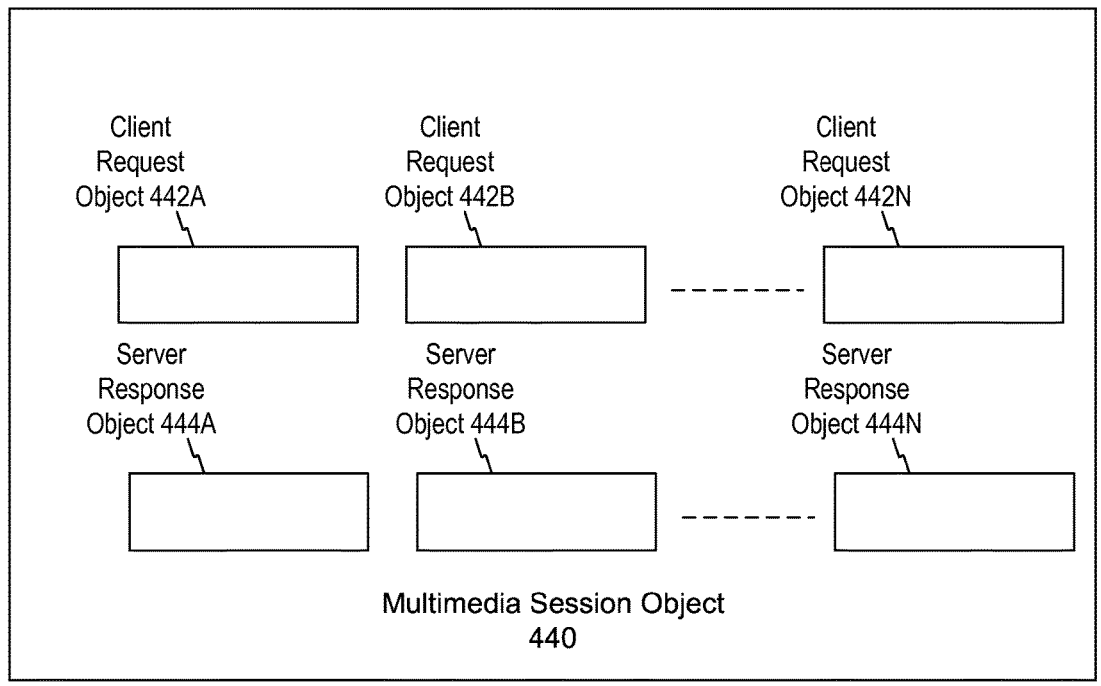
FIG. 4B is a block diagram illustrating an exemplary multimedia session, consistent with embodiments of the present disclosure.

In some embodiments, multimedia session generator 228 can associate the request objects and any corresponding response objects with the corresponding multimedia session object. A multimedia session object can be associated with one or more client request objects and more than one server-response object. FIG. 4B is a block diagram illustrating an exemplary multimedia session object 440 associated with multiple client request objects 442A, 442B, . . . 442N, and multiple server response objects 444A, 444B, . . . 444N. For example, if during a particular multimedia session, transaction boundaries detector 226 generates a plurality of (e.g., five) client requests objects and a plurality of server response objects (e.g., five), multimedia session generator 228 can associate the client request objects and any corresponding server response object with the corresponding multimedia session object. Therefore, the multimedia session object can provide an indication of a number of transactions for communicating the multimedia content associated with a multimedia session between client 210 and server 260.

As stated above, in a single multimedia session, the idle time interval between the consecutive multimedia contents is less than a predefined session threshold idle time. If the idle time interval between two consecutive multimedia contents (e.g., two adjacent videos) exceeds the session threshold idle time, multimedia session generator 228 can generate two multimedia sessions objects corresponding to the two consecutive multimedia contents. For example, if the idle time interval between two adjacent videos exceeds thirty seconds, multimedia session generator 228 can treat the two videos as two separate multimedia sessions and generated two corresponding multimedia session objects. In some embodiments, one or more client request objects and/or one or more server response objects can be associated with a multimedia session object representing the multimedia session. For example, client request objects representing the client requests sent during a particular multimedia session and server response objects representing the server responses to those client requests can be associated with the multimedia session object corresponding to the particular multimedia session.

In some embodiments, multimedia session generator 228 can associate the multimedia session objects representing corresponding multimedia sessions with a look-up table. The look-up table can be searchable based on a client/source IP address, a server/destination IP address, or a concatenation of the client/source and server/destination IP addresses. Multimedia session generator 228 can also retrieve the multimedia session object from the look-up table before classifying the multimedia content in the corresponding multimedia session.

As shown in FIG. 2, multimedia detector and classifier 220 can also include a multimedia classifier 230. In some embodiments, multimedia classifier 230 can classify the multimedia content contained in a multimedia session as communicating under progressive download (PD) protocols or adaptive bit rate (ABR) protocols. For example, multimedia classifier 230 can retrieve a particular multimedia session object from a look-up table, and determine the number of client request objects and/or the number of server responses objects associated with the particular multimedia session. The number of client request/server response objects represents the number of client requests/server responses associated with the multimedia session. Multimedia classifier 230 can determine the relation of the number of client requests with respect to a threshold number of client-requests. For example, multimedia classifier 230 can compare the number of client request objects (e.g., five) with a predefined threshold number (e.g., 1). If the number of client request objects for the multimedia session is greater than the predefined threshold number, multimedia classifier 230 can classify the multimedia content of the multimedia session object as communicating under ABR protocols. If the number of client requests is less than or equal to the predefined threshold number, multimedia classifier 230 can classify the multimedia content of the multimedia session object as communicating under PD protocols. It is appreciated that multimedia classifier 230 can also classify the multimedia content of the multimedia session object as being communicated under any other type of protocols.

In some embodiments, multimedia classifier 230 can classify the multimedia content in a multimedia session at a preconfigured time point after the multimedia session begins (e.g., at 10 seconds after the beginning of transmission). The preconfigured time period allows multimedia session generator to associate client requests and/or server responses with the multimedia session for a certain amount of time for classification purposes. In some embodiments, a multimedia session may end before the preconfigured time period lapses. If, after the multimedia session ends, the number of client requests associated with the multimedia session is greater than the predefined threshold number of client requests, multimedia classifier 230 can classify the multimedia content of the multimedia session object as communicating under ABR protocols, or can indicate a failure to classify. If, after the multimedia session ends, the number of client requests is less than or equal to the predefined threshold number of client requests, multimedia classifier 230 may not be able to classify the multimedia content and can indicate a failure to classify.

The classification of multimedia content can be used for applying one or more traffic management optimization techniques to the multimedia content to client 210. For example, depending on the classification, TPPE unit 222 can enable or disable streaming policy control (SPC). In some embodiments, SPC can be enabled at the beginning of transmitting a multimedia session, regardless of whether the multimedia content in the multimedia session is transmitted under ABR protocols or PD protocols. If, after a preconfigured period of time, multimedia detector and classifier 220 classifies the multimedia content as communicating under ABR protocols, SPC can be continually enabled. If, after the preconfigured period of time, multimedia detector and classifier 220 classifies the multimedia content as communicating under PD protocols, SPC can be disabled.

In some embodiments, SPC can be disabled at the beginning of transmitting a multimedia session, regardless of whether the multimedia content data is transmitted under ABR protocols or PD protocols. If, after a preconfigured period of time, multimedia detector and classifier 220 classifies the multimedia content as communicating under ABR protocols, SPC can be enabled. If, after a preconfigured period of time, multimedia detector and classifier 220 classifies the multimedia content as communicating under PD protocols, SPC can be continually disabled.

In some embodiments, TPPE unit 222 can apply traffic management optimization, such as SPC, to multiple clients, (e.g., multiple terminals within a same local area network), a subscriber, multiple subscribers, a specific terminal, or a particular mobile applications executing on the specific terminal. TPPE unit 222 can also apply SPC at the connection level. For example, if there are two connections, TPPE unit 222 can apply SPC separately to each individual connection. In some embodiments, TPPE unit 222 can apply SPC to an individual multimedia session.

While the above description of adaptive traffic manager 130, multimedia detector and classifier 220, multimedia detector 224, transaction boundaries detector 226, multimedia session generator 228, and multimedia classifier 230 uses secured transactions and encrypted multimedia content data as examples, it is appreciated that the above description can also be applied to unsecured transactions and unencrypted multimedia content data.

Figure 5:
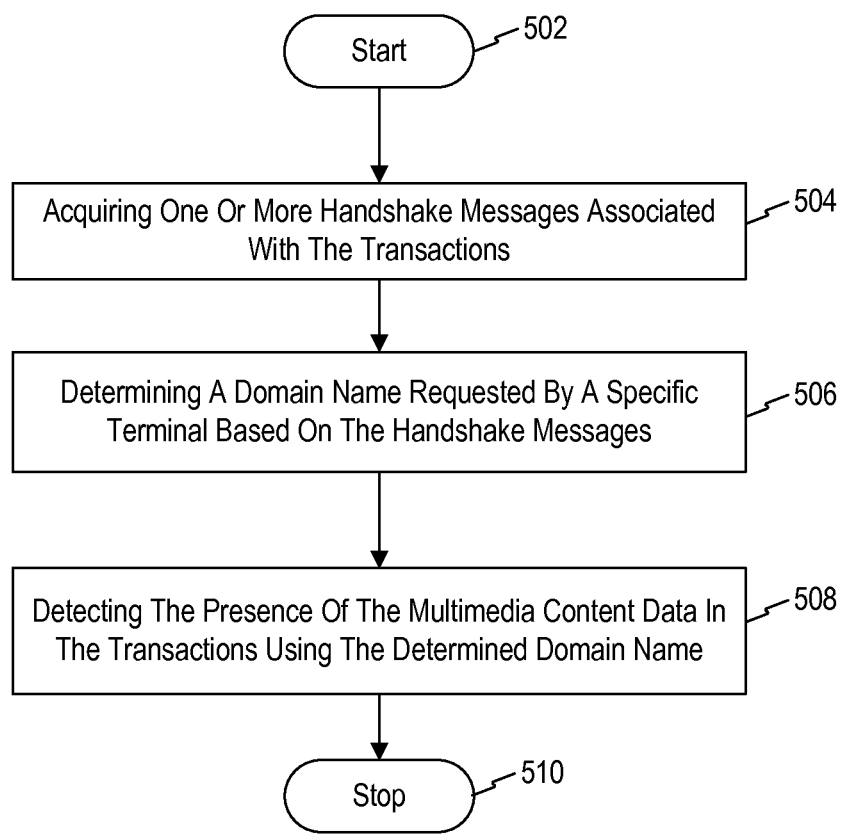
FIG. 5 is a flowchart representing an exemplary method for detecting presence of multimedia content data in secured transactions, consistent with embodiments of the present disclosure.

FIG. 5 is a flowchart representing an exemplary method 500 for detecting the presence of multimedia content data in secured transactions. Referring to FIG. 5, it will be readily appreciated by one of ordinary skill in the art that the illustrated procedure can be altered to delete steps or further include additional steps. Method 500 can be performed by an adaptive traffic manager (e.g., adaptive traffic manager 130).

After initial step 502, the adaptive traffic manager can acquire (step 504) one or more handshake messages associated with the secured transactions. In some embodiments, the acquisition of the one or more handshake messages can be performed by a traffic processor (e.g., TPPE unit 222) of the adaptive traffic manager. The traffic processor is a lower stack in the processing stack of the adaptive traffic manager. The traffic processor can receive multimedia content, which can include video and/or web data, and provide the multimedia content to other elements and/or modules in the adaptive traffic manager. The multimedia content can be stored in a data storage device (e.g., data storage 234) that is local to or remote from the adaptive traffic manager. The traffic processor is responsible for routing traffic between the client (e.g., client 210) and the server (e.g., server 260). The traffic processor can also implement traffic management techniques including blocking, rate limiting, lossless and lossy data compression, and other traffic optimization techniques. The traffic processor can be a software program and/or a hardware device.

The adaptive traffic manager can determine (step 506) a domain name requested by a specific terminal based on the one or more handshake messages. In some embodiments, the determination of the domain name can be performed by a multimedia detector and classifier (e.g., the multimedia detector and classifier 220) of the adaptive traffic manager. An exemplary determination flowchart is further described in FIG. 6 (below).

The adaptive traffic manager can also detect (step 508) the presence of the multimedia content data in the secured transactions based at least in part on the determined domain name. In some embodiments, the detection step can be performed by the multimedia detector and classifier. The detection of the presence of the multimedia content can be used for providing one or more traffic management optimization for the multimedia content data to the client. For example, if the multimedia detector and classifier detects that multimedia content is present in the transaction, additional network bandwidth can be allocated to the client. In some embodiments, traffic management optimization can be applied to multiple client devices (e.g., multiple terminals within a same local area network), a subscriber, multiple subscribers, a specific client device, or a particular mobile application or applications installed on the specific client device (e.g., a YouTube application installed on a mobile terminal).

After step 508, method 500 can proceed to an end 510. Method 500 can also be repeated any desired number of times for detecting the presence of multimedia content in one or more secured transactions.

Figure 6:
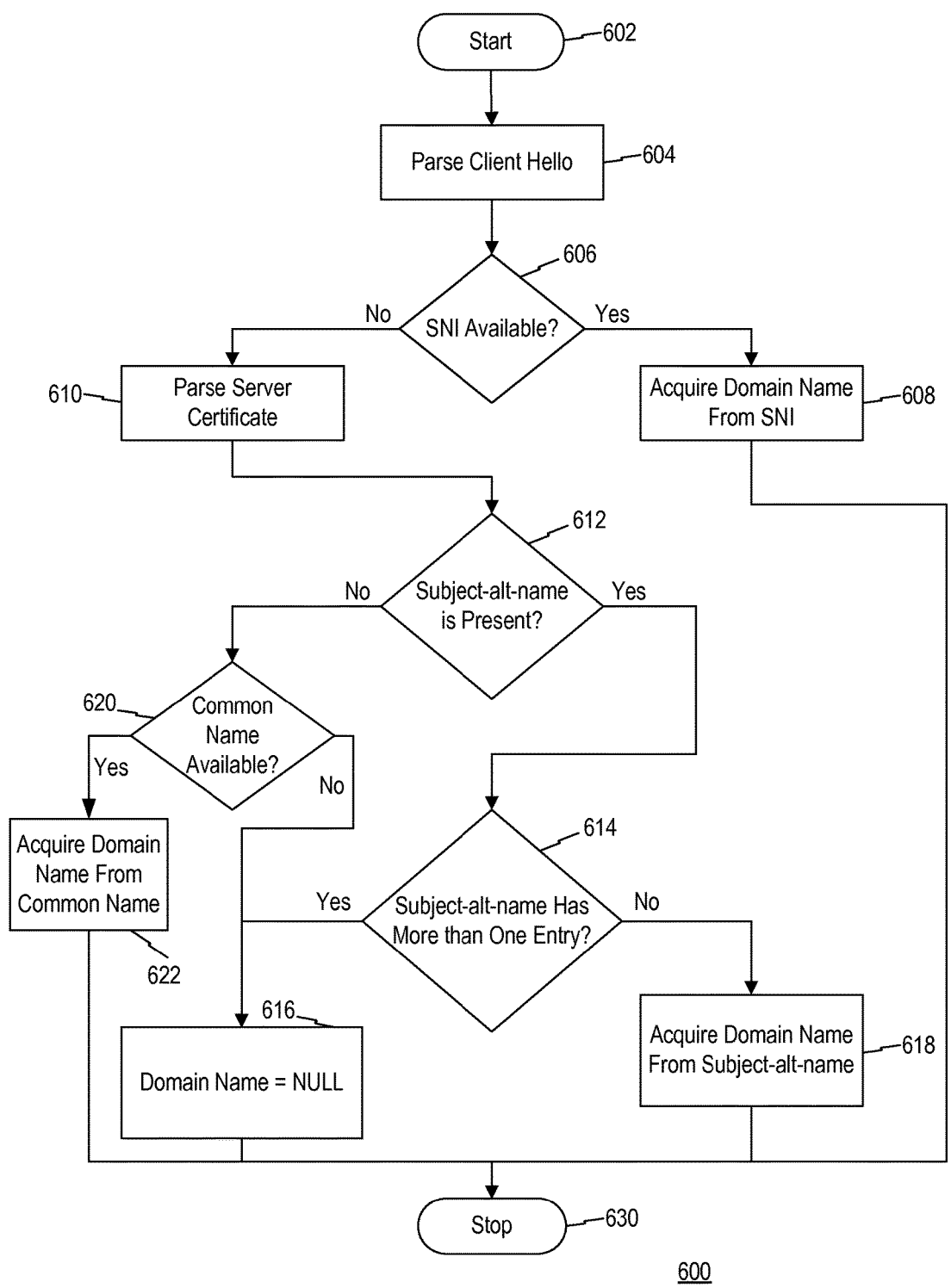
FIG. 6 is a flowchart representing an exemplary method for determining a domain name requested by a specific terminal based on the one or more handshake messages, consistent with embodiments of the present disclosure.

FIG. 6 is a flowchart representing an exemplary method 600 for determining a domain name requested by a specific terminal based on the one or more handshake messages. Referring to FIG. 6, it will be readily appreciated by one of ordinary skill in the art that the illustrated procedure can be altered to delete steps or further include additional steps. Method 600 can be performed by an adaptive traffic manager (e.g., adaptive traffic manager 130), and more particularly by a multimedia detector and classifier (e.g., the multimedia detector and classifier 220) of the adaptive traffic manager. While method 600 is described as being performed by the multimedia detector and classifier, it is appreciated that other components of adaptive traffic manager or other devices can be involved.

In some embodiments, the multimedia detector and classifier can parse (step 604) a client hello message. As stated above, the client hello message can include information such as the highest SSL or TLS protocol version the client supports, ALPN indicating a list of supported application protocols, NPN protocols, a random number, a list of suggested cipher suites, a session ID, and a server name indication (SNI). After parsing the client hello message, the multimedia detector and classifier can determine (step 606) whether the SNI field is available based on the parsed fields in the client hello message.

In some embodiments, the SNI field provides an identification of the destination host requested by the client. Therefore, determining the availability of the SNI field can enable the multimedia detector and classifier to detect the presence of multimedia content in the secured transactions. Under the SSL or TLS protocol, including the SNI field in the client hello message can be optional. Therefore, if the multimedia detector and classifier determines that an SNI field is available, it can acquire (step 608) a domain name (e.g., youtube.com) using the SNI field. Referring back to FIG. 5, the adaptive traffic manager can detect (step 508) the presence of the multimedia content in the secured transactions based at least in part on the determined domain name. For example, if the domain name in the SNI field indicates the identification of the destination host is youtube.com, it is likely that the multimedia content (e.g., a YouTube video) is present in the secured transactions.

In some embodiments, the SNI field can be used for detecting presence of the multimedia content when multiple destination hosts share a common IP address. For example, multiple virtual hosts or services can be executed on a shared physical computing infrastructure (e.g., a shared physical server).

Referring back to FIG. 6, if the multimedia detector and classifier determines (step 606) that an SNI field is not available in the client hello message, or if the SNI field does not provide an identification of the destination host requested by the client, the multimedia detector and classifier can parse (step 610) a server certificate message to determine (step 612) whether a subject-alt-name (SAN) field is available in the server certificate message. As stated above, the SAN field can enable the identifying of the entity (e.g., Google Inc.) associated with the public key.

In some embodiments, if the multimedia detector and classifier determines that an SAN field is available, the multimedia detector and classifier can further determine (step 614) whether the number of entries associated with the SAN field equals one. For example, the multimedia detector and classifier can determine that the SAN field has one or more entries, indicating multiple entities may be associated with the public key (e.g., subsidiaries or partners of a Google Inc.). In some embodiments, if the number of entries associated with the SAN field is greater than one, the multimedia detector and classifier may not be able to determine the identity of the entity, and the associated domain name based on the SAN field entries. The multimedia detector and classifier can thus provide (step 616), for example, a "null" signal, indicating the failure of detecting presence of multimedia content in the secured transactions. If the number of entries associated with the SAN field equals one, the multimedia detector and classifier can acquire (step 618) the domain name associated with the identity of the entity based on the SAN field, and therefore the adaptive traffic manager can detect (step 508 of FIG. 5) the presence of the multimedia content in the secured transactions based at least in part on the determined domain name. In some embodiments, the adaptive traffic manager may still detect the presence of the multimedia content even if the number of entries associated with the SAN field is greater than one. For example, if the multimedia detector and classifier of the adaptive traffic manager determines that a substantial number of multiple entries in the SAN field identify entities supplying multimedia content, the multimedia detector and classifier can determine the domain names. Based on the determined domain names, the multimedia detector and classifier can detect the presence of multimedia content. It is appreciated that the multimedia detector and classifier can detect the presence of multimedia content based on the entries in the SAN field in any desired manner.

In some embodiments, if the multimedia detector and classifier determines (step 612) that an SAN field is not available in the server certificate message, or if the number of entries associated with the SAN field is greater than one, the multimedia detector and classifier can determine (step 620) whether a common name field is available in the server certificate message. As stated above, a common name can be composed of host and domain name (e.g., www.youtube.com). In some embodiments, the common name can be the same as the web address that the client requests to access when establishing a secured connection. If the multimedia detector and classifier determines that a common name field is available, it can acquire (step 622) the domain name based on the determined common name field. If the multimedia detector and classifier determines (step 620) that a common name field is unavailable, the multimedia detector and classifier may not be able to determine a domain name based on the common name field, and thus can provide (step 616), for example, a "null" signal, indicating the failure of detecting presence of multimedia content in one or more secured transactions.

As shown in FIG. 6, after step 608, 616, 618, or 622, method 600 can proceed to an end 630. Method 600 can also be repeated any desired number of times for detecting presence of multimedia content in one or more secured transactions.

Figure 7:
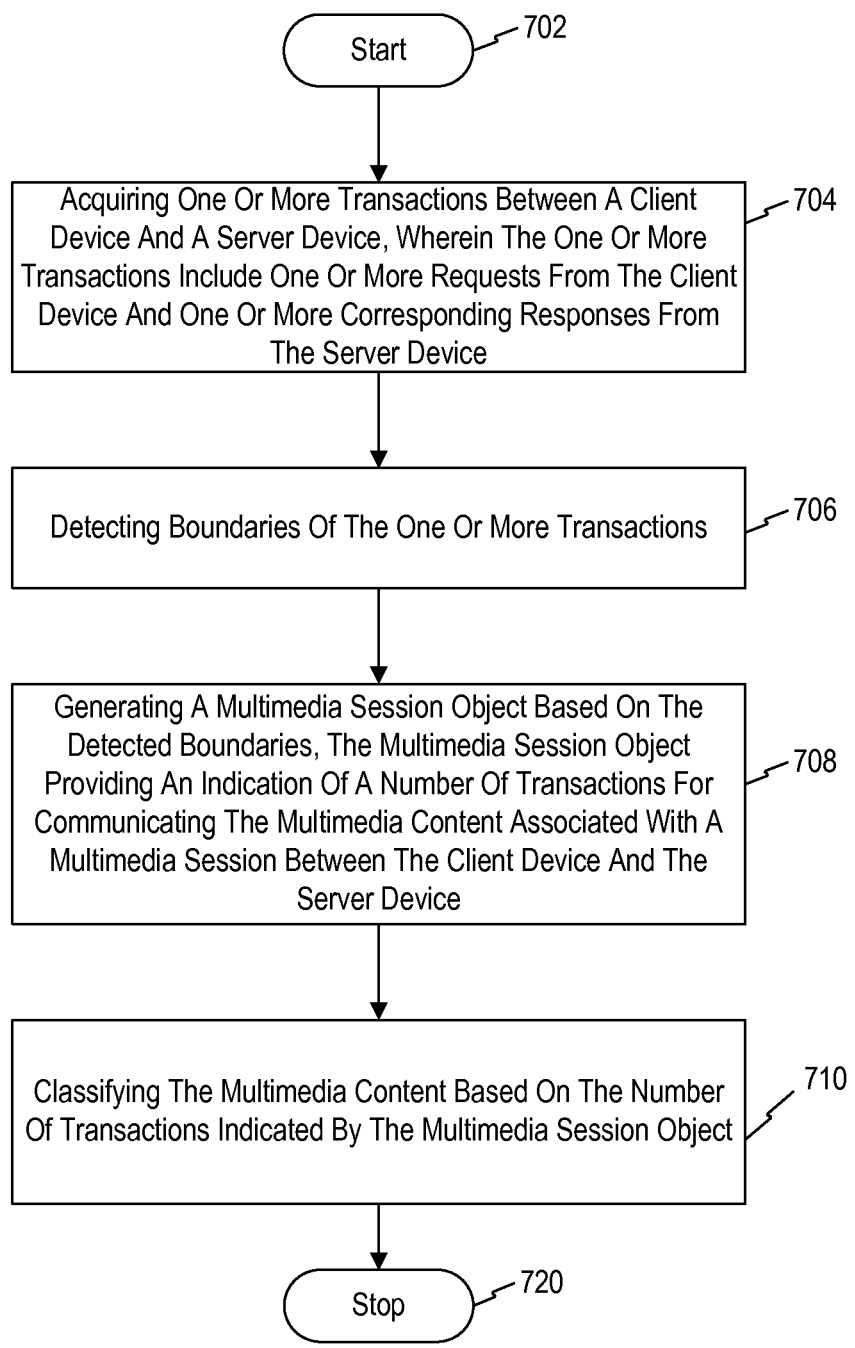
FIG. 7 is a flowchart representing an exemplary method for classifying multimedia content in a plurality of transactions, consistent with embodiments of the present disclosure.

FIG. 7 is a flowchart representing an exemplary method 700 for classifying multimedia content in a plurality of secured transactions. Referring to FIG. 7, it will be readily appreciated by one of ordinary skill in the art that the illustrated procedure can be altered to delete steps or further include additional steps. Method 700 can be performed by an adaptive traffic manager (e.g., adaptive traffic manager 130), and more particularly by a multimedia detector and classifier (e.g., the multimedia detector and classifier 220) of the adaptive traffic manager. While method 700 is described as being performed by the multimedia detector and classifier, it is appreciated that other components of adaptive traffic manager or other devices can be involved.

After initial step 702, the adaptive traffic manager can acquire one or more transactions between a client device (e.g., client 210) and a server device (e.g., server 260). The one or more transactions can include one or more requests from the client and one or more corresponding responses from the server.

After step 704, the multimedia detector and classifier can detect (step 706) transaction boundaries associated with one or more transactions. The one or more transactions can include one or more client requests and one or more server responses.

In some embodiments, the multimedia detector and classifier can acquire request data included in the one or more client requests represented by client request objects, and obtain one or more request times associated with acquiring the request data included in the one or more client requests. For example, in some embodiments, the multimedia detector and classifier can generate request objects representing the client requests and response objects representing the server response. The request object and the response object can be any record, pointer, or data structure stored on a hardware and/or software-based data storage device (e.g, data storage 234). For example, the contents of the request and response objects can be stored as records or indexes in a single data structure or the contents of each request and response objects can be recorded in a separate transaction list data structure. With respect to a first client request object, the multimedia detector and classifier can record the initial request time when the first client request object is generated. In some embodiments, after the client sends a first request data associated with the client request represented by the first client request object to the server, the multimedia detector and classifier can acquire the first request data and record the number of bytes of the first request data and a timestamp indicating when the first request data is sent or acquired. If the client sends subsequent request data associated with the same client request represented by the first client request object, the multimedia detector and classifier can acquire this subsequent request data and record the number of bytes in the subsequent request data and timestamps indicating when the subsequent request data is sent or acquired.

Similarly, the multimedia detector and classifier can record the initial response time when the response object is generated. In some embodiments, after the server sends first response data associated with a first server response to the client, the multimedia detector and classifier can acquire the first response data and record the number of bytes of the first response data and a timestamp indicating when the first response data is sent or acquired. If the server sends subsequent response data associated with the same server response, the multimedia detector and classifier can acquire the subsequent response data. The multimedia detector and classifier can record the number of bytes in the subsequent response data and timestamps indicating when the subsequent response data are sent or acquired.

After obtaining times associated with acquiring the client request data, the multimedia detector and classifier can determine the transaction boundaries based on the times associated with the acquiring of the request data and a transaction threshold idle time. In some embodiments, the multimedia detector and classifier can provide a timer having a preconfigured transaction threshold idle time (e.g., 2 seconds). The timer can be restarted after adaptive traffic manager 130 receives, via a client socket, request data associated with the same client request. If the multimedia detector and classifier determines that the client has not sent any subsequent request data associated with the same client request for a time that is equal to or greater than the transaction threshold idle time, or that that the client has been idle for at least the transaction threshold idle time, the multimedia detector and classifier can mark the first client request object as closed. If a client request object is marked as closed, the multimedia detector and classifier records the stop time in the client request object and determines that the request portion of the current transaction is ended.

In some embodiments, a transaction ends after the corresponding TCP connection is closed. In some implementation of TLS protocols, a TCP connection can be closed after additional messages are exchanged between the client and the server in a teardown sequence. In some embodiments, a transaction ends after a subsequent client request is acquired by the multimedia detector and classifier, indicating the beginning of a subsequent transaction.

As shown in FIG. 7, the multimedia detector and classifier can generate (step 708) a multimedia session object based on the detected boundaries. The multimedia session object can provide an indication of the number of transactions for communicating the multimedia content associated with a multimedia session between the client and the server. In some embodiments, after the client and the server establishes a secured connection for transmitting multimedia content, the multimedia detector and classifier can generate a multimedia session object representing the multimedia session. The multimedia session object can be any record, pointer, or data structure stored on a hardware and/or software-based data storage device (e.g, data storage 234).

In some embodiments, the multimedia detector and classifier can associate the request objects and any corresponding response objects with the corresponding multimedia session object. A multimedia session object can be associated with more than one client request objects and more than one corresponding server-response objects. For example, if during a particular multimedia session, the multimedia detector and classifier generates a plurality of (e.g., five) client requests objects and a plurality of corresponding server response objects (e.g., five), the multimedia detector and classifier can associate the client requests objects and/or corresponding server response object with the corresponding multimedia session object. Therefore, the multimedia session, represented by the multimedia session object, can provide indication of the number of client requests and/or the number of corresponding server responses for communicating the multimedia content associated with the multimedia session.

As stated above, in a single multimedia session, the idle time interval between the consecutive multimedia contents is less than a predefined session threshold idle time. If the idle time interval between two consecutive multimedia contents (e.g., two adjacent videos) exceeds the session threshold idle time, the multimedia detector and classifier can generate two multimedia sessions corresponding to the two consecutive multimedia contents. For example, if the idle time interval between two adjacent videos exceeds thirty seconds, the multimedia detector and classifier can treat the two videos as two separate multimedia sessions, and generate two multimedia session objects.

In some embodiments, the multimedia detector and classifier can associate the multimedia session objects representing corresponding multimedia sessions with a look-up table. The look-up table can be searchable based on a client/source IP address and/or a server/destination IP address, or a concatenation of the client/source and server/destination IP addresses. The multimedia detector and classifier can also retrieve the multimedia session object from the look-up table before classifying the multimedia content in the corresponding multimedia session.

As shown in FIG. 7, the multimedia detector and classifier can classify (step 710) the multimedia content based on the number of transactions indicated by the multimedia session object. In some embodiments, the multimedia detector and classifier can classify the multimedia content contained in a multimedia session as communicating under progressive download (PD) protocols or adaptive bit rate (ABR) protocols. For example, the multimedia detector and classifier can retrieve a particular multimedia session object from a look-up table, and determine the number of client request objects and/or the number of corresponding server responses objects associated with the particular multimedia session. The number of client request/server response objects represents the number of client requests/server responses associated with the multimedia session. The multimedia detector and classifier can determine the relation of the number of client requests with respect to a threshold number of client requests. For example, the multimedia detector and classifier can compare the number of client request objects (e.g., five) with a predefined threshold number (e.g., 1). If the number of client request objects is greater than the predefined threshold number, the multimedia detector and classifier can classify the multimedia content as communicating under ABR protocols. If the number of client requests is less than or equal to the predefined threshold number, the multimedia detector and classifier can classify the multimedia content as communicating under PD protocols. It is appreciated that the multimedia detector and classifier can also classify the multimedia content as communicating under any other type of protocols.

In some embodiments, the multimedia detector and classifier can classify the multimedia content in a multimedia session at a preconfigured time point after the multimedia session begins (e.g., at 10 seconds after the beginning of transmission). The preconfigured time period allows a multimedia session generator (e.g., multimedia session generator 228) to associate client requests and/or server responses with the multimedia session for a certain amount of time for classification purposes. In some embodiments, a multimedia session may end before the preconfigured time period lapses. If, after the multimedia session ends, the number of client requests associated with the multimedia session is greater than the predefined threshold number of client requests, the multimedia detector and classifier can classify the multimedia content as communicating under ABR protocols, or can indicate a failure to classify. If, after the multimedia session ends, the number of client requests is less than or equal to the predefined threshold number of client requests, the multimedia detector and classifier may not be able to classify the multimedia content and can indicate a failure to classify.

After step 710, method 700 can proceed to an end 720. Method 700 can also be repeated any desired number of times for designating any number of established associations as persisting associations.

In the foregoing specification, an element (e.g., adaptive traffic manager or multimedia detector and classifier) can have one or more processors and at least one memory for storing program instructions corresponding to methods 500, 600, and 700, consistent with embodiments of the present disclosure. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs and/or special purpose computers.

Embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. An apparatus for detecting the presence of multimedia content in one or more transactions, comprising:
 a traffic processor configured to acquire one or more handshake messages communicated over a network, the handshake messages being associated with the transactions and comprising data converted into formatted data arranged in accordance with a given communications protocol format; and
 a multimedia detector configured to:
   determine a domain name requested by a specific terminal by
     determining if a subject-alt-name (SAN) field is available in the one or more handshake messages, and
     acquiring the domain name using the SAN field when available, and
   detect the presence of the multimedia content data in the transactions based on a decision that multimedia content is likely available from a network resource identified by the determined domain name, wherein the detection of the presence of the multimedia content is used for optimizing and reporting of the multimedia content before the multimedia content is provided to the specific terminal.

2. The apparatus of claim 1, wherein the handshake messages comprise at least one of a client hello message, a server hello message, or a server certificate message.

3. The apparatus of claim 1, wherein the multimedia detector is configured to determine the domain name requested by the specific terminal based on the one or more handshake messages, wherein:
the multimedia detector is further configured to:
parse a client hello message;
determine whether a server name indication field is available based on the parsed client hello message; and
if the server name indication field is available, acquire the domain name based on the server name indication field.

4. The apparatus of claim 1, wherein at least one of the transactions is a secured transaction.

5. An apparatus for detecting the presence of multimedia content in one or more transactions, comprising:
a traffic processor configured to acquire one or more handshake messages communicated over a network, the handshake messages being associated with the transactions and comprising data converted into formatted data arranged in accordance with a given communications protocol format; and
a multimedia detector configured to:
determine a domain name requested by a specific terminal based on at least a portion of the data contained in the one or more handshake messages, and
detect the presence of the multimedia content data in the transactions based on a decision that multimedia content is likely available from a network resource identified by the determined domain name, wherein the detection of the presence of the multimedia content is used for optimizing and reporting of the multimedia content before the multimedia content is provided to the specific terminal;
wherein the multimedia detector is configured to determine the domain name requested by the specific terminal based on the one or more handshake messages, wherein:
the multimedia detector is further configured to:
parse a client hello message;
determine whether a server name indication field is available based on the parsed client hello message; and
if the server name indication field is available, acquire the domain name based on the server name indication field;
wherein the multimedia detector is further configured to:
if the server name indication field is unavailable, parse a server certificate message;
determine whether a subject-alt-name field is available based on the parsed server certificate message; and
if the subject-alt-name field is available, acquiring the domain name based on the subject-alt-name field.

6. The apparatus of claim 5, wherein if the subject-alt-name field is available, the multimedia detector is further configured to acquire the domain name based on the subject-alt-name field, wherein:
the multimedia detector is further configure to:
determine whether the number of entries associated with the subject-alt-name field equals one; and
if the number of entries associated with the subject-alt-name field equals one, acquire the domain name based on the determined entry in the subject-alt-name field.

7. The apparatus of claim 5, wherein the multimedia detector is further configured to:
if the subject-alt-name field is unavailable, determine whether a common-name field is available based on the parsed server certificate message; and
acquire the domain name based on the common-name field.

8. A method for detecting the presence of multimedia content in one or more transactions, the method being performed by one or more processors, the method comprising:
acquiring one or more handshake messages communicated over a network, the handshake messages being associated with the transactions and comprising data converted into formatted data arranged in accordance with a given communications protocol format;
determining a domain name requested by a specific terminal by
determining if a subject-alt-name (SAN) field is available in one of the acquired handshake messages, and
acquiring the domain name using the SAN field when available; and
detecting the presence of the multimedia content in the transactions based on a decision that multimedia content is likely available from a network resource identified by the determined domain name, wherein the detection of the presence of the multimedia content is used for optimizing and reporting of the multimedia content before the multimedia content is provided to the specific terminal.

9. The method of claim 8, wherein the handshake messages comprise at least one of a client hello message, a server hello message, or a server certificate message.

10. The method of claim 8, wherein determining the domain name requested by the specific terminal based on the one or more handshake messages comprises:
parsing a client hello message;
determining whether a server name indication field is available based on the parsed client hello message; and
in response to the server name indication field being available, acquiring the domain name based on the server name indication field.

11. A method for detecting the presence of multimedia content in one or more transactions, the method being performed by one or more processors, the method comprising:
acquiring one or more handshake messages communicated over a network, the handshake messages being associated with the transactions and comprising data converted into formatted data arranged in accordance with a given communications protocol format;
determining a domain name requested by a specific terminal based on at least a portion of the data contained in the acquired handshake messages; and
detecting the presence of the multimedia content in the transactions based on a decision that multimedia content is likely available from a network resource identified by the determined domain name, wherein the detection of the presence of the multimedia content is used for optimizing and reporting of the multimedia content before the multimedia content is provided to the specific terminal;

wherein determining the domain name requested by the specific terminal based on the one or more handshake messages comprises:
  parsing a client hello message;
  determining whether a server name indication field is available based on the parsed client hello message; and
  in response to the server name indication field being available, acquiring the domain name based on the server name indication field; and
wherein the method further comprises:
  in response to the server name indication field being unavailable, parsing a server certificate message;
  determining whether a subject-alt-name field is available based on the parsed server certificate message; and
  in response to the subject-alt-name field being available, acquiring the domain name based on the subject-alt-name field.

12. The method of claim 11, wherein if the subject-alt-name field is available, acquiring the domain name based on the subject-alt-name field further comprising:
  determining whether the number of entries associated with the subject-alt-name field equals one; and
  in response to the number of entries associated with the subject-alt-name field equals one, acquiring the domain name based on the determined entry in the subject-alt-name field.

13. The method of claim 11, further comprising:
  in response to if the subject-alt-name field being unavailable, determining whether a common-name field is available based on the parsed server certificate message; and
  acquiring the domain name based on the common-name field.

14. The method of claim 8, wherein at least one of the transactions is a secured transaction.

15. A non-transitory computer readable storage medium storing instruction that are executable by a one or more processors of a server to cause the server to perform a method for detecting the presence of multimedia content in one or more transactions, the method comprising:
  acquiring one or more handshake messages communicated over a network, the handshake message being associated with the transactions and comprising data converted into formatted data arranged in accordance with a given communications protocol format;
  determining a domain name requested by a specific terminal by
    determining if a subject-alt-name (SAN) field is available in one of the acquired handshake messages, and acquiring the domain name using the SAN field when available; and
  detecting the presence of the multimedia content in the transactions based on a decision that multimedia content is likely available from a network resource identified by the determined domain name, wherein the detection of the presence of the multimedia content is used for optimizing and reporting of the multimedia content before the multimedia content is provided to the specific terminal.

16. The non-transitory computer readable storage medium of claim 15, wherein the handshake messages comprises at least one of a client hello message, a server hello message, or a server certificate message.

17. The non-transitory computer readable storage medium of claim 15, wherein determining the domain name requested by the specific terminal based on the one or more handshake messages further comprises:
  parsing a client hello message;
  determining whether a server name indication field is available based on the parsed client hello message; and
  if the server name indication field is available, acquiring the domain name based on the server name indication field.

18. The computer readable storage medium of claim 15, wherein at least one of the transactions is a secured transaction.

19. A non-transitory computer readable storage medium storing instruction that are executable by a one or more processors of a server to cause the server to perform a method for detecting the presence of multimedia content in one or more transactions, the method comprising:
  acquiring one or more handshake messages communicated over a network, the handshake message being associated with the transactions and comprising data converted into formatted data arranged in accordance with a given communications protocol format;
  determining a domain name requested by a specific terminal based on at least a portion of the data contained in the acquired handshake messages; and
  detecting the presence of the multimedia content in the transactions based on a decision that multimedia content is likely available from a network resource identified by the determined domain name, wherein the detection of the presence of the multimedia content is used for optimizing and reporting of the multimedia content before the multimedia content is provided to the specific terminal;
wherein determining the domain name requested by the specific terminal based on the one or more handshake messages further comprises:
  parsing a client hello message;
  determining whether a server name indication field is available based on the parsed client hello message; and
  if the server name indication field is available, acquiring the domain name based on the server name indication field; and
wherein the method for detecting the presence of multimedia content in the one or more transactions further comprising:
  if the server name indication field is unavailable, parsing a server certificate message;
  determining whether a subject-alt-name field is available based on the parsed server certificate message; and
  if the subject-alt-name field is available, acquiring the domain name based on the subject-alt-name field.

20. The non-transitory computer readable storage medium of claim 19, wherein if the subject-alt-name field is available, acquiring the domain name based on the subject-alt-name field further comprising:
  determining whether the number of entries associated with the subject-alt-name field equals one; and
  if the number of entries associated with the subject-alt-name field equals one, acquiring the domain name based on the determined entry in the subject-alt-name field.

21. The non-transitory computer readable storage medium of claim 19, wherein the instructions that are executable by the one or more processors to cause the server to perform:

if the subject-alt-name field is unavailable, determining whether a common-name field is available based on the parsed server certificate message; and acquiring the domain name based on the common-name field.

22. An apparatus for classifying multimedia content in one or more transactions, comprising:

a traffic processor configured to acquire one or more transactions between a client device and a server device, wherein the one or more transactions include one or more requests from the client device and one or more corresponding responses from the server device;

a transaction boundary detector configured to detect boundaries of the one or more transactions;

a multimedia session generator configured to generate a multimedia session object based on the detected boundaries of the one or more transactions, the multimedia session object providing an indication of a number of transactions for communicating the multimedia content associated with a multimedia session between the client device and the server device; and a multimedia classifier configured to classify the multimedia content based on the number of transactions indicated by the multimedia session object.

23. The apparatus of claim 22, wherein the transaction boundary detector is configured to detect boundaries comprises the transaction boundary detector being configured to:

acquire request data included in the one or more requests from the client device; obtain one or more request times associated with acquiring the request data included in the one or more requests from the client device; and detect the transaction boundaries based on the one or more request times associated with the acquiring of the request data and a first threshold idle time.

24. The apparatus of claim 23, wherein the transaction boundary detector is further configured to:

acquire response data included in the one or more server responses; and obtain one or more response times associated with acquiring the response data included in the one or more server responses.

25. The apparatus of claim 22, wherein the transaction boundary detector is configured to detect boundaries based on at least one of: a closed TCP connection or receiving of request data included in a subsequent transaction.

26. The apparatus of claim 22, wherein the multimedia session generator is configured to generate the multimedia session object comprises the multimedia session generator being configured to:

determine a time interval between the multimedia content and a subsequent multimedia content;

generate the multimedia session object based on the time interval and a second threshold idle time; and associate the number of transactions for communicating the multimedia content with the generated multimedia session object.

27. The apparatus of claim 22, wherein the multimedia session generator is further configured to:

associate the generated multimedia session object with a look-up table, wherein the lookup table is searchable based on at least one of client IP addresses, source IP addresses, server IP addresses, or destination IP addresses; and retrieve the generated multimedia session object from the look-up table before classifying the multimedia content.

28. The apparatus of claim 22, wherein the multimedia classifier is configured to classify the multimedia contents comprises the multimedia classifier being configured to:

determine the relation of the number of transactions with respect to a threshold number of transactions; and classify, based on the determination, the multimedia content as being communicated under progressive download (PD) protocols or adaptive bit rate (ABR) protocols.

29. The apparatus of claim 22, further comprising:

a multimedia detector configured to detect the presence of the multimedia content in the one or more transactions, prior to the transaction boundary detector detects the boundaries.

30. The apparatus of claim 22, wherein the multimedia session represents at least one of: one or more video clips, one or more episodes, or one or more movies.

31. A method for classifying multimedia content in one or more transactions, the method being performed by one or more processors, comprising:

acquiring one or more transactions between a client device and a server device, wherein the one or more transactions include one or more requests from the client device and one or more corresponding responses from the server device;

detecting boundaries of the one or more transactions;

generating a multimedia session object based on the detected boundaries, the multimedia session object providing an indication of a number of transactions for communicating the multimedia content associated with a multimedia session between the client device and the server device; and classifying the multimedia content based on the number of transactions indicated by the multimedia session object.

32. The method of claim 31, wherein the detecting boundaries of the one or more transactions comprises:

acquiring request data included in the one or more requests from the client device;

obtaining one or more request times associated with acquiring the request data included in the one or more requests from the client device; and detecting the boundaries based on the one or more request times associated with the acquiring of the request data and a first threshold idle time.

33. The method of claim 32, further comprising:

acquiring response data included in the one or more server responses; and obtaining one or more response times associated with acquiring the response data included in the one or more server responses.

34. The method of claim 31, wherein detecting the boundaries of the one or more transactions is based on at least one of: a closed TCP connection or receiving of request data included in a subsequent transaction.

35. The method of claim 31, wherein generating the multimedia session object comprises:

determining a time interval between the multimedia content and a subsequent multimedia content;

generating the multimedia session object based on the time interval and a second threshold idle time; and associating the number of transactions for communicating the multimedia content with the generated multimedia session object.

36. The method of claim 31, further comprising:

associating the generated multimedia session object with a look-up table, wherein the look-up table is searchable based on at least one of client IP addresses, source IP addresses, server IP addresses, or destination IP addresses; and retrieving the generated multimedia session object from the look-up table before classifying the multimedia content.

37. The method of claim 31, wherein the classifying the multimedia content comprises:

determining the relation of the number of transactions with respect to a threshold number of transactions; and classifying, based on the determination, the multimedia content as being communicated under progressive download (PD) protocols or adaptive bit rate (ABR) protocols.

38. The method of claim 31, wherein prior to detecting the boundaries, further comprising:

detecting the presence of the multimedia content in the one or more transactions.

39. The method of claim 31, wherein the multimedia session represents at least one of: one or more video clips, one or more episodes, or one or more movies.

40. A non-transitory computer readable storage medium storing instructions that are executable by one or more processors of a server to cause the server to perform a method for classifying multimedia content in one or more transactions, the method comprising:

acquiring one or more transactions between a client device and a server device, wherein the one or more transactions include one or more requests from the client device and one or more corresponding responses from the server device;

detecting boundaries of the one or more transactions;

generating a multimedia session object based on the detected boundaries, the multimedia session object providing an indication of a number of transactions for communicating the multimedia content associated with a multimedia session between the client device and the server device; and classifying the multimedia content based on the number of transactions indicated by the multimedia session object.

41. The computer readable storage medium of claim 40, wherein the detecting the boundaries associated with the one or more transactions comprises:

acquiring request data included in the one or more requests from the client device;

obtaining one or more request times associated with acquiring the request data included in the one or more requests from the client device; and detecting the boundaries based on the one or more request times associated with the acquiring of the request data and a first threshold idle time.

42. The computer readable storage medium of claim 41, further comprising instructions that are executable by one or more processors to cause the server to perform:

acquiring response data included in the one or more server responses; and obtaining one or more response times associated with acquiring the response data included in the one or more server responses.

43. The computer readable storage medium of claim 40, wherein detecting the boundaries of the one or more transactions is based on at least one of: a closed TCP connection or receiving of request data included in a subsequent transaction.

44. The computer readable storage medium of claim 40, wherein generating the multimedia session object comprises:

determining a time interval between the multimedia content and a subsequent multimedia content;

generating the multimedia session object based on the time interval and a second threshold idle time; and associating the number of transactions for communicating the multimedia content with the generated multimedia session object.

45. The computer readable storage medium of claim 40, further comprising instructions that are executable by one or more processors to cause the server to perform:

associating the generated multimedia session object with a look-up table, wherein the look-up table is searchable based on at least one of client IP addresses, source IP addresses, server IP addresses, or destination IP addresses; and retrieving the generated multimedia session object from the look-up table before classifying the multimedia content.

46. The computer readable storage medium of claim 40, wherein the classifying the multimedia content comprises:

determining the relation of the number of transactions with respect to a threshold number of transactions; and classifying, based on the determination, the multimedia content as being communicated under progressive download (PD) protocols or adaptive bit rate (ABR) protocols.

47. The computer readable storage medium of claim 40, wherein prior to detecting the boundaries, further comprising instructions that are executable to cause the server to perform:

detecting the presence of the multimedia content in the one or more transactions.

48. The computer readable storage medium of claim 40, wherein the multimedia session represents at least one of: one or more video clips, one or more episodes, or one or more movies.

* * * * *